Nov. 14, 1967 J. G. SHERLOCK ET AL 3,352,149
EROSION GAGE
Filed Dec. 24, 1964 2 Sheets-Sheet 1

INVENTORS
Jack G. Sherlock
James R. Reames
BY Claude Funkhouser
ATTORNEY
Stanley N. Garber
AGENT

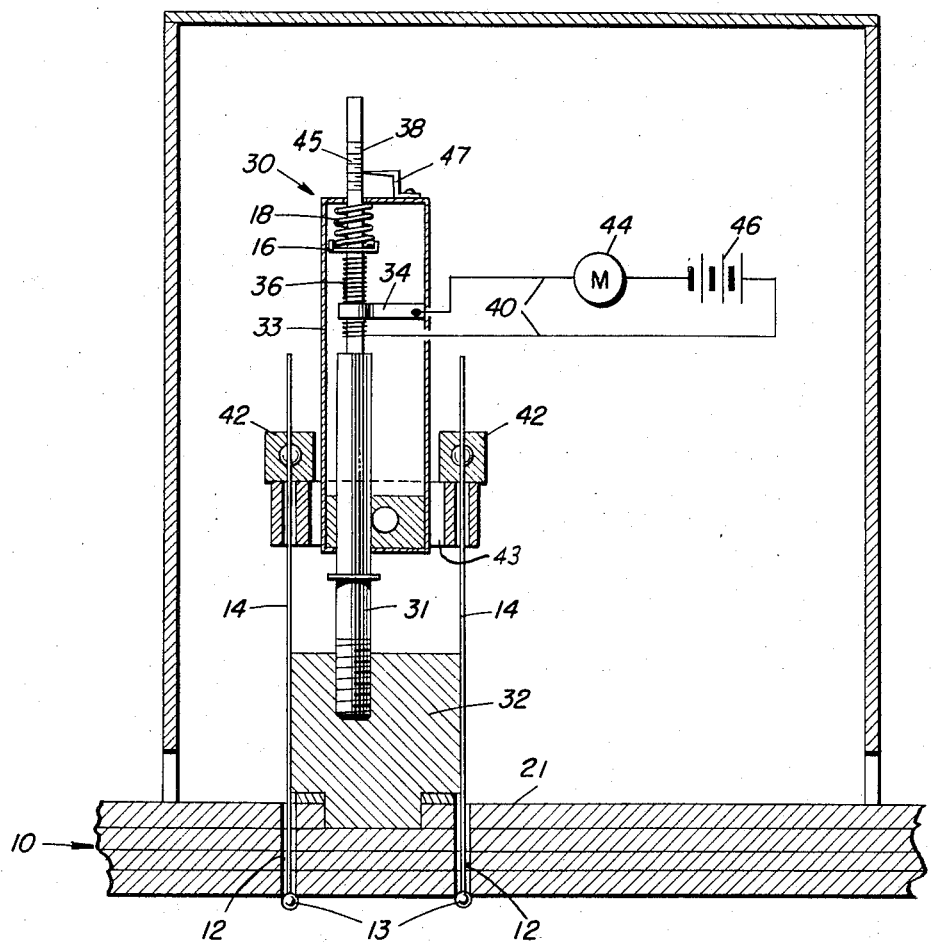

United States Patent Office 3,352,149
Patented Nov. 14, 1967

3,352,149
EROSION GAGE
Jack G. Sherlock, Oakhurst, and James R. Reames, Ben Lomond, Calif., assignors to the United States of America as represented by the Secretary of the Navy
Filed Dec. 24, 1964, Ser. No. 421,138
5 Claims. (Cl. 73—86)

ABSTRACT OF THE DISCLOSURE

An erosion gage for indicating the amount and rate of advance of char in a material wherein a char depth follower means is drawn through the charred layer while forming. The measured amount of follower means movement through the increments of char formation shows the extent of char formation in the material.

---

The present invention relates to test instruments and more particularly to a device for indicating the amount and rate of advance of char in either an ablative or insulating material for use in a rocket engine casing.

In the rocket engine art, particularly in solid propellant rocket engines, it is a general practice to coat the inner surface of the propellant casing with an insulating material and the inner surface of the exhaust nozzle with an ablative cooling material. The intended purpose of the insulating material in the propellant casing is to prevent damage to the casing due to overheating. The insulating material is, therefore, disposed between the solid propellant grain and the casing wall to insulate the casing wall from the heat produced by the burning propellant. For a similar reason, ablative cooling material is disposed along the inner surface of the exhaust nozzle to protect same from the extreme high temperature of the burning exhaust gases. As the ablative material is heated by the exhaust gases, it slowly burns away, thereby protecting the casing therebeneath.

Therefore, in designing rocket engines, the amount and thickness of a particular insulation or ablative material utilized must be calculated very accurately since too little material would not provide adequate protection while too much material would be excess dead weight that the rocket would have to carry.

In the past, the only known method for experimentally determining the char characteristics of an insulation or ablative material was to measure a test specimen both before and after heat was applied. With this method, however, it was not possible to determine the char recession characteristics as a function of time but, rather, it was only possible to determine the total amount of char that occurred during the entire test.

The general purpose of this invention is, therefore, to provide a char indicator which provides either total or incremental char recession characteristics and which possesses none of the afore-described disadvantages. To attain this, the present invention utilizes a unique sensing apparatus which provides a continual indication of the rate at which the char advances.

Accordingly, an object of the present invention is to provide a test device which indicates the amount and rate of char advance in either an insulating or an ablative cooling material.

Another object is to provide a device which is characterized by simplicity of construction and extreme accuracy of results.

A further object of the invention is to provide a device which permits control of the test environment by utilizing the device as a feedback element.

Other objects and many of the attendant advantages of this invention will be readily appreciated as the same becomes better understood by reference to the following detailed description when considered in conjunction with the accompanying drawings in which:

FIG. 3 is a sectional view showing another embodiment of the invention.

Figure 1:
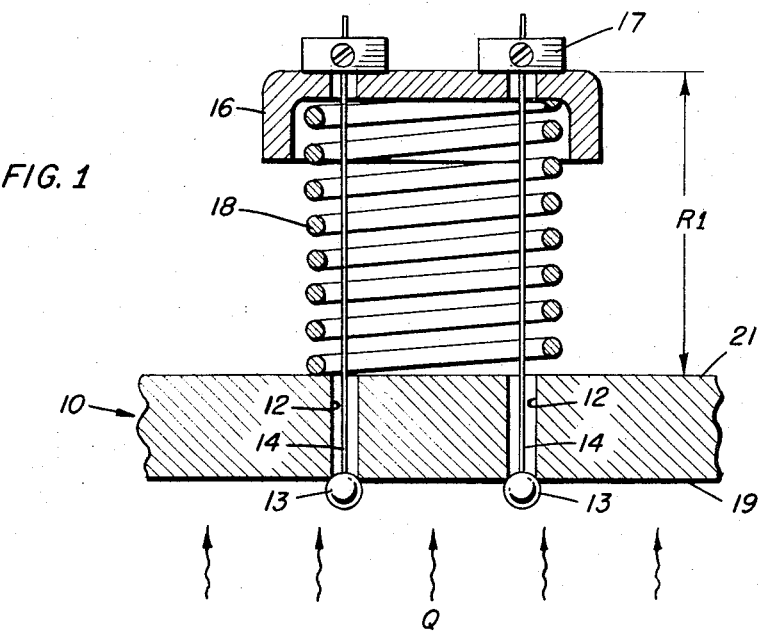
FIG. 1 is a side elevation view in section showing an embodiment of the invention.

Referring now to the drawings wherein like reference characters designate like or corresponding parts throughout the several views, there is shown in FIG. 1 an insulating or ablative cooling material 10 having apertures 12 therethrough. Balls 13, made of tungsten or the like, are suspended beneath material 10 by wires 14, also of tungsten or the like. The upper ends of the wires 14 pass through the apertures 12 and are secured to a spring retainer cup 16 by locking means 17 so that the balls 13 are suspended from the retainer cup 16 by the wires 14. A compression spring 18 is disposed between the upper surface 21 of material 10 and the spring retainer cup 16 to urge cup 16 and therefore balls 13 upwardly. The balls 13 are prevented from passing upwardly through the apertures 12 since the diameters thereof are slightly greater than the diameters of the apertures.

Figure 2:
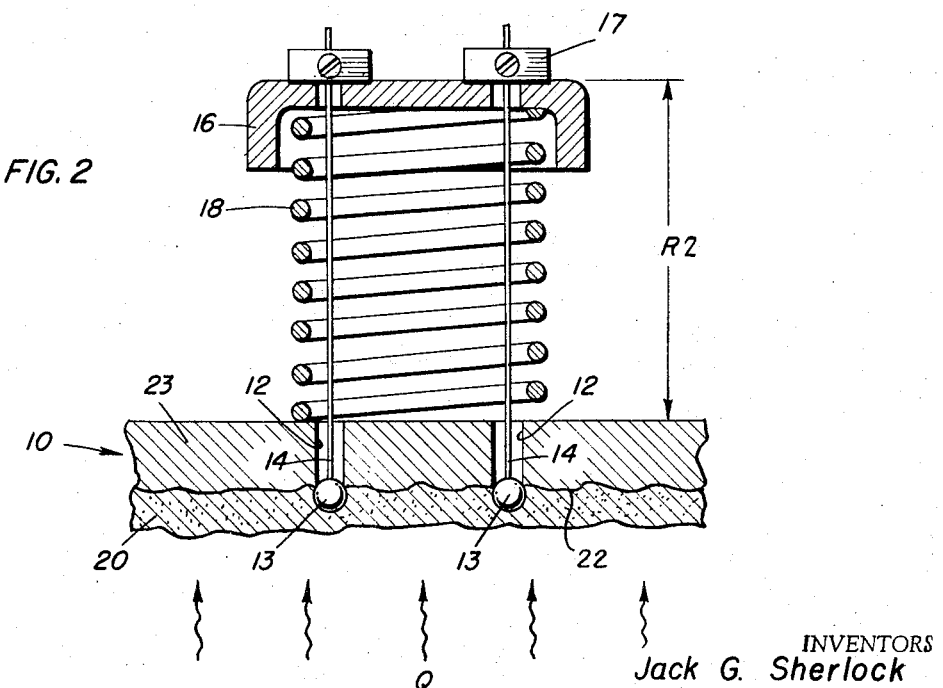
FIG. 2 is a side elevation view in section showing the embodiment of FIG. 1 after a portion of the material has charred.

As shown in FIG. 2, the lower surface 19 of material 10 is subjected to a high heat flux Q which is produced by the combustion of the rocket engine propellant in the casing (not shown). The charred portion 20 of material 10 therefore advances toward the upper surface 21 of the material 10 as long as the heat flux continues. As the char layer 20 forms, it covers the balls 13 and protects them from oxidation and further destruction. The difference in structural strength between the charred material 20 and the virgin material 23 maintains the balls 13, under the influence of spring 18, in the plane of the interface 22. Therefore, the balls 13 and the spring retainer cup 16 move upwardly an amount equal to the amount of char advance and, accordingly, the difference between distances R1 and R2 is the total amount of char advance for the particular test.

In the embodiment shown in FIG. 3, a spring loaded potentiometer 30 is utilized in conjunction with the ball sensor mechanism of FIGS. 1 and 2 to provide an electrical output signal that is proportional to the char advance. As clearly illustrated, a guide post 31 is secured to a spacer block 32 which in turn is secured to the upper surface 21 of material 10. The body 33 of potentiometer 30 is slidably received on guide post 31 and spring biased upwardly by compression spring 18 and spring retainer cup 16, the latter being secured to the guide post 31. The balls 13, suspended by wires 14, are secured to the housing 33 of potentiometer 30 through locking means 42 and a spider member 43. A wiper element 34 is also secured to the potentiometer housing 33 and is in sliding contact with an electrical resistance element 36 located on the necked-down portion of guide post 31. A pair of electrical leads 40, connected to the wiper element 34 and the resistance element 36, are serially connected to a meter 44, or the like, and a source of electrical potential 46. The necked-down portion 38 of guide post 31 could also be calibrated with a scale 45 to coact with the pointer 47 fixed to housing 33.

In the operation of the embodiment shown in FIGS. 1 and 2, it is clearly apparent that as the char 20 advances, the balls 13 and the spring retainer cup 16, under the influence of spring 18, advance therewith. The difference in distances R1 and R2 (between the initial position of the spring retainer cup 16 and the final position of the spring retainer cup 16) is the total amount of char advance for a given test. Obviously, the rate of char advance could be determined by measuring distance R2–R1 at spaced time intervals. The embodiment shown in FIG. 3 operates in substantially the same manner as that shown in FIGS. 1 and 2 except that a spring biased potentiometer 30 is utilized to provide an electrical output signal proportional to the amount of char advance rather than the distance R2–R1 provided by cup 16. In the embodiment shown in FIG. 3, the casing 33 and the wiper arm 34 affixed thereto move upwardly with balls 13 as the char advances. Since the resistance element 36 on guide post 31 remains stationary, the signal indicated by meter 44 varies with the position of wiper arm 34 and is, therefore, proportional to the amount of char advance in material 10. An alternate or meter calibration reading could also be obtained from scale 45 and pointer 47. Furthermore, it is apparent that wiper arm 34 could be fixed to the stationary guide post 31 and resistance element 36 fixed to the movable potentiometer casing 33, as the resulting signal provided thereby would be the same. It is also apparent that each ball 13 could actuate separate potentiometers so that a char advance relationship at spaced intervals along material 10 could be obtained.

It should be understood, of course, that the foregoing disclosure reltes to only preferred embodiments of the invention and that many modifications or alterations may be made therein without departing from the spirit and the scope of the invention as set forth in the appended claims.

What is claimed is:

1. A device for indicating the amount and rate of advance of char comprising in combination:
   a mass comprised of an ablative, insulative or like material having a plurality of transverse apertures therethrough, the lower surface of said mass being subjected to a heat source;
   a spring retainer having wire means secured thereto, said wire means passing through said apertures;
   a spring disposed between said spring retainer and the upper surface of said mass; and
   ball means secured to said wire means adjacent the lower surface of said material, said ball means being so dimensioned as to normally prevent passage thereof through said apertures;
   whereby, as the surface of said material adjacent said ball means upon subjection to a heat source chars, the ball means and the spring retainer coact under the influence of said spring to move upwardly, thereby providing an indication of the amount of char, and whereby the rate of advance of the char may be determined by successive indications as obtained at predetermined intervals during a predetermined period of time.

2. A device for indicating the amount of char in a test material having a plurality of apertures therethrough comprising:
   retainer means having support means secured thereto, said support means passing through the apertures in the test material;
   resilient means adapted to be disposed between said retainer means and the upper surface of the test material; and
   char depth follower means secured to said support means adjacent the lower surface of the test material, said char depth follower means being so dimensioned as to normally prevent passage thereof through the apertures;
   said resilient means biasing said depth follower means in a manner to effect an advancing movement of said depth follower means incrementally through the lower surface and toward the upper surface of said material as it chars, said char depth follower means thereby being maintained in the plane of the interface between the charred material and the test material whereby the amount of upward movement of the char depth follower means and the retainer, coacting under the influence of said resilient means, indicates the amount of char in the test material.

3. The device of claim 2 being further characterized by indicator means secured to said retainer means for measuring the amount of upward movement of the char depth follower means and thereby measuring the amount of char in the test material.

4. A device for indicating the amount and rate of advance of char in a test material subjected to heat from an ambient source comprising:
   a spring biasing potentiometer disposed adjacent one side of the test material and having an electrical resistance element and a wiper arm element relatively movable to one another;
   char depth follower means disposed adjacent the other side of the test material, said follower means being secured to one of said relatively movable elements; and
   indicator means connected to said potentiometer and to a source of electrical potential;
   whereby, as the char advances in the test material, the follower means actuates one of said relatively movable elements thereby to indicate the position of the char on the indicating means.

5. A device for indicating the amount and rate of advance of char, as set forth in claim 4, wherein:
   said char depth follower means comprising a plurality of balls which are secured to one of said relatively movable elements by a plurality of wires, said wires passing through apertures in the test material.

References Cited

UNITED STATES PATENTS

| | | | |
|---|---|---|---|
| 2,470,498 | 5/1949 | Lankford | 33—143 |
| 2,894,331 | 7/1959 | Stratman | 33—143 |
| 3,018,663 | 1/1962 | Dunlop | 73—341 |

RICHARD C. QUEISSER, *Primary Examiner.*

JAMES GILL, *Examiner.*

C. I. McCLELLAND, J. J. SMITH, *Assistant Examiners.*